(12) United States Patent
Tanaka et al.

(10) Patent No.: US 6,744,954 B1
(45) Date of Patent: Jun. 1, 2004

(54) SUBMARINE OPTICAL CABLE, OPTICAL FIBER UNIT EMPLOYED IN THE SUBMARINE OPTICAL CABLE, AND METHOD OF MAKING OPTICAL FIBER UNIT

(75) Inventors: Shigeru Tanaka, Yokohama (JP); Eisuke Sasaoka, Yokohama (JP); Itaru Sakabe, Yokohama (JP); Takeo Tsurumi, Yokohama (JP); Yasushi Ito, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/441,559

(22) Filed: Nov. 17, 1999

(30) Foreign Application Priority Data

Nov. 20, 1998 (JP) .......................... 10-331214
Jan. 29, 1999 (JP) .......................... 11-022426

(51) Int. Cl.⁷ ................................. G02B 6/44
(52) U.S. Cl. ..................................... 385/113
(58) Field of Search ................ 385/100, 101, 385/109–113

(56) References Cited

U.S. PATENT DOCUMENTS

| | | | | |
|---|---|---|---|---|
| 4,279,470 A | * | 7/1981 | Portinari et al. | 385/111 |
| 4,554,116 A | * | 11/1985 | Cooke | 264/1.28 |
| 4,826,278 A | * | 5/1989 | Gartside, III et al. | 385/105 |
| 5,495,546 A | * | 2/1996 | Bottoms, Jr. et al. | 385/101 |
| 5,838,864 A | * | 11/1998 | Patel et al. | 385/113 |
| 5,982,966 A | * | 11/1999 | Bonicel | 385/100 |
| 6,017,857 A | * | 1/2000 | Heimann et al. | 508/136 |
| 6,195,487 B1 | * | 2/2001 | Anderson et al. | 385/101 |

FOREIGN PATENT DOCUMENTS

| | | |
|---|---|---|
| DE | 26 35 917 | 2/1978 |
| DE | 42 28 272 A1 | 3/1994 |
| EP | 240165 | 10/1987 |
| FR | 2534385 | 4/1984 |
| JP | 10-170775 | 6/1998 |
| WO | WO 96/15466 | 5/1966 |

OTHER PUBLICATIONS

"New Submarine Cable Design For Long Haul, High Bit Rate Systems", by Libert et al., International Wire and Cable Symposium Proceedings, 1996, pp. 8–12.

* cited by examiner

*Primary Examiner*—Brian Healy
*Assistant Examiner*—Michelle R. Connelly-Cushwa
(74) *Attorney, Agent, or Firm*—McDermott, Will & Emery

(57) ABSTRACT

The present invention relates to a wide-band, low-loss, submarine optical cable excellent in productivity, an optical fiber unit employed in the submarine optical cable, and a method of making the optical fiber unit. The optical fiber unit employed in the submarine optical cable comprises a loose structure in which one or more coated optical fibers are accommodated together with a soft resin in a space formed within a plastic support. In particular, one or more compression members are embedded in the plastic support along the space accommodating the coated optical fibers. The compression members closely in contact with the plastic support prevents the shrinkage of the plastic support from occurring due to temperature changes before forming a cable utilizing the optical fiber unit. Preventing the shrinkage of the plastic support from occurring before forming the cable suppresses the increase in surplus length ratio of the accommodated coated optical fibers, thereby effectively restraining the transmission loss of the submarine optical cable from increasing due to the increase in surplus length ratio.

15 Claims, 15 Drawing Sheets

Fig.4A
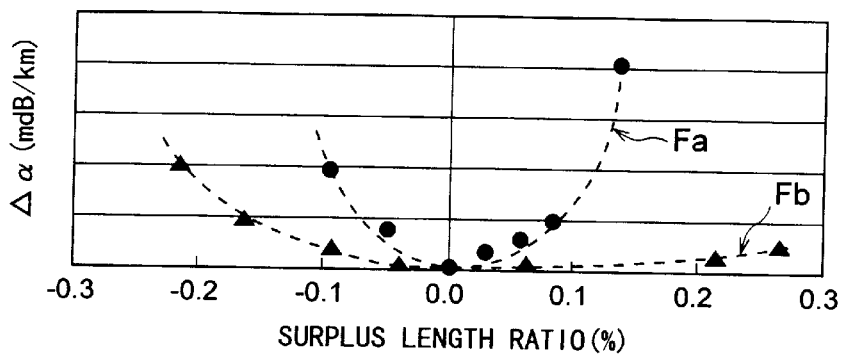
Fig.4B
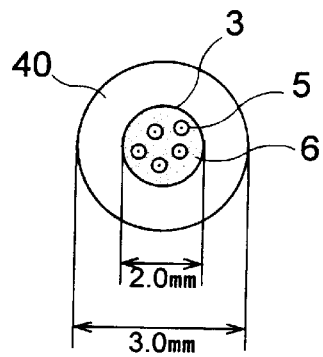
Fig.4C
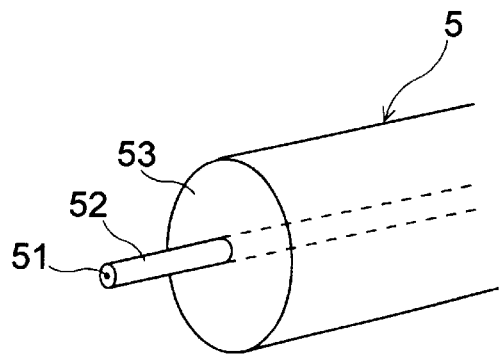
Fig.4D
| Type | | Aeff (um2) | Dispersion (ps/nm/km) | Dispersion Slope (ps/nm2/km) |
|---|---|---|---|---|
| FiberA (Fa) | DSF | 84 | -2.3 | 0.09 |
| FiberB (Fb) | SMF | 63 | 16 | 0.06 |

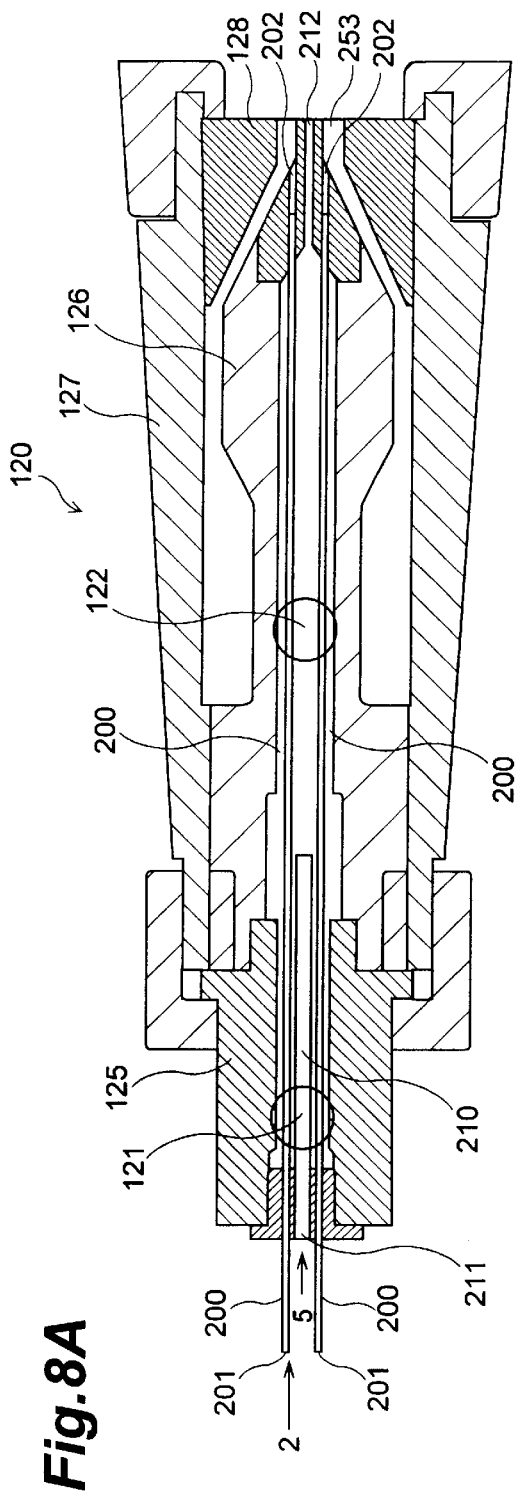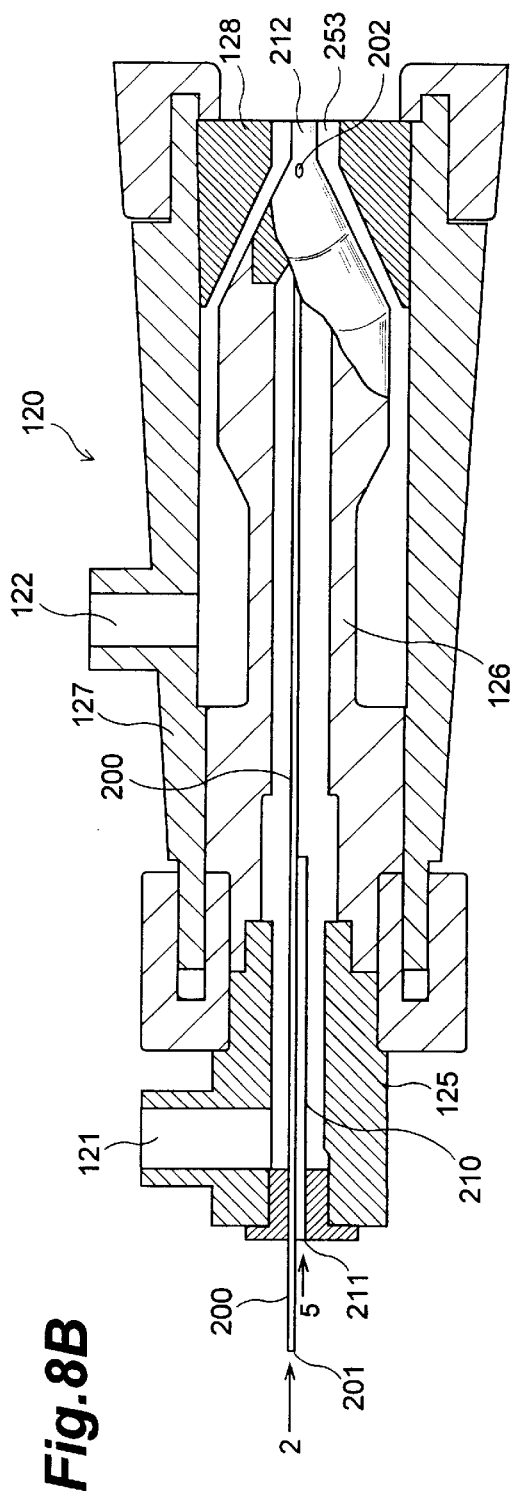

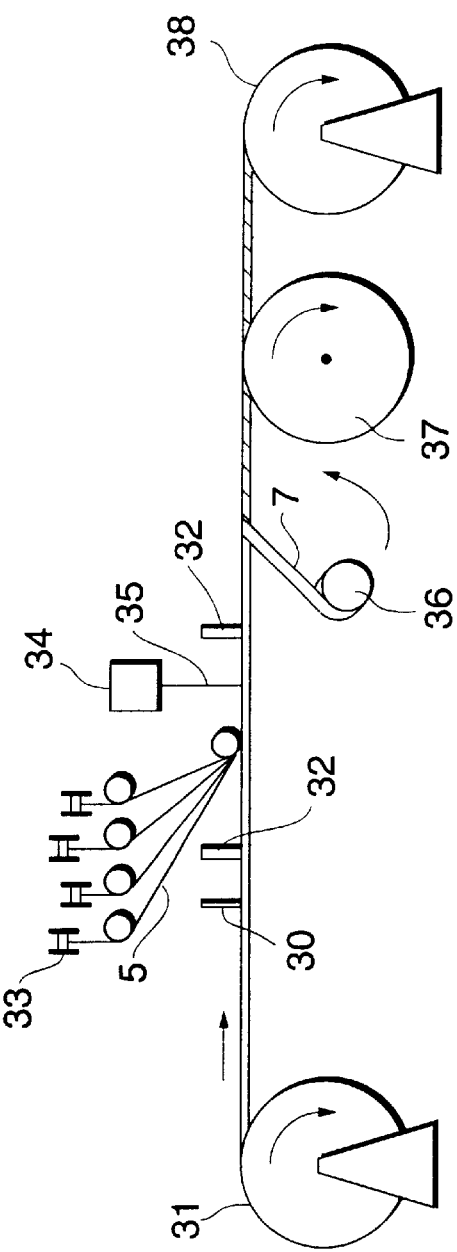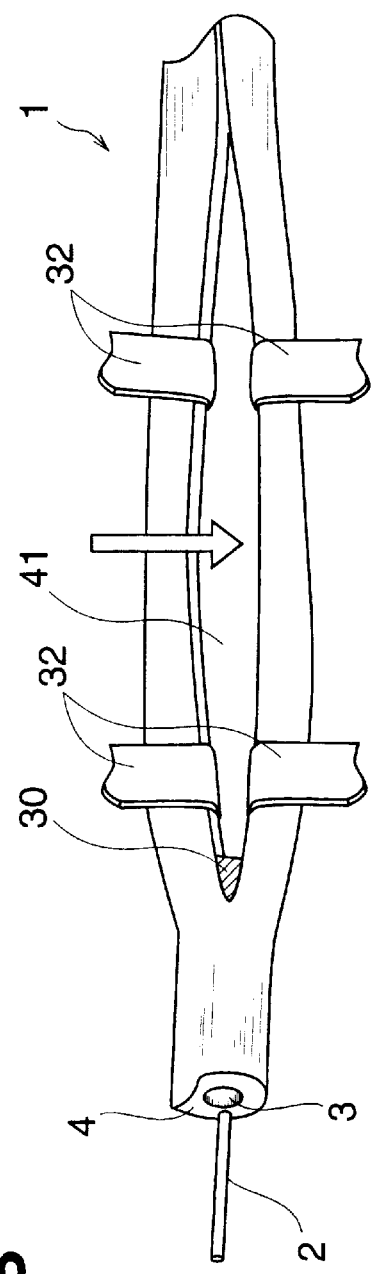
Fig.11A
Fig.11B

SUBMARINE OPTICAL CABLE, OPTICAL FIBER UNIT EMPLOYED IN THE SUBMARINE OPTICAL CABLE, AND METHOD OF MAKING OPTICAL FIBER UNIT

BACKGROUND OF THE INVENTION

1. Field of the Invention

The present invention relates to a submarine optical cable, an optical fiber unit employed in the submarine optical cable, and a method of making the optical fiber unit.

2. Related Background Art

Submarine optical cables have been developed substantially in parallel with land-based cables since the mid-1970s when the reduction of loss in optical fibers had advanced and enhanced the feasibility of optical fiber communications. Optical fibers have quite excellent characteristics as a transmission medium, such as low loss, wide band, small diameter, light weight, no induction, and no crosstalk. On the other hand, the optical fibers have not only brittleness and breakableness inherent in glass materials but also a demerit that optical loss is likely to increase due to bending or external forces.

The structure of a submarine optical cable needs to reflect its purpose of use, environment of use, method of installation, and method of repair, which should be grasped beforehand. Namely, it is required for the submarine optical cable to endure external forces such as tension, bending, abrasion, and the like upon installing the cable and collecting the cable at the time of repairing, and maintain stable characteristics over a long period of 25 years or more under a submarine environment as deep as 8,000 m (at a water pressure of 800 atmospheres and a water temperature of about 3° C.). When a transpacific system is taken into consideration, the maximum cable length extends to about 10,000 km. If seawater should enter the cable, the strength and transmission characteristics of optical fibers will deteriorate. Therefore, it is required to prevent seawater from entering the cable. Further, it is necessary for the cable to have an economical structure which can easily be made long while satisfying various conditions mentioned above.

A first conventional example of submarine optical cable used for the above-mentioned purpose is disclosed in Japanese Patent Application Laid-Open No. HEI 10-170775. As shown in FIG. 1, the first conventional example comprises an optical fiber unit B and an outer sheath A with a predetermined structure disposed at the outer periphery of the optical fiber unit B. The optical fiber unit B is constituted by a center steel wire D, coated optical fibers C stranded about the center steel wire D, and a UV-curable resin E securing the coated optical fibers C to the center steel wire D. For restraining microbend from occurring due to thermal expansion/contraction upon changes in temperature, each coated optical fiber C comprises three resin layers disposed at the outer periphery of an optical fiber. The first layer is made of a UV-curable resin having a lower Young's modulus, the second layer is made of a UV-curable resin having a higher Young's modulus, and the third layer is made of a nylon resin having a higher Young's modulus.

On the other hand, as a second conventional example, a submarine optical cable having a metal tube is disclosed in IWCS Proceedings 1996, pp. 8–9: New Submarine Cable Design for Long Haul, High Bit Rate Systems. As shown in FIG. 2, the optical fiber unit J of the second conventional example comprises a metal tube F in which coated optical fibers G and a jelly-like resin H are introduced. The submarine optical cable of the second conventional example comprises an outer sheath I with a predetermined structure disposed at the outer periphery of the optical fiber unit J.

SUMMARY OF THE INVENTION

As a result of studies concerning the conventional submarine optical cables, the inventors have found the following problems.

Along with the introduction of WDM communications, optical-fibers having a large mode field diameter or effective area have become necessary for submarine optical cables as well. In such an optical fiber, however, power distribution widely spreads into its cladding, so that the radiation mode may change as the optical fiber is bent, thus increasing loss. Hence, in the optical fiber unit B (FIG. 1) in which the coated optical fibers C wound about the outer periphery of the tension member D are secured with the UV-curable resin E as in the case of the first conventional example, bending loss may increase.

On the other hand, in the second conventional example comprising an optical fiber unit in which the coated optical fibers G and the jelly-like resin H are introduced into the metal tube F, it is necessary that the coated optical fibers G and the jelly-like resin H be introduced into the metal tube F while the latter is being made by longitudinally welding a metal tape. In this manufacturing method, there is a limit to the welding speed. As a consequence, the cost of manufacture becomes quite high, and the high temperature of welding heat is likely to affect the coated optical fibers, thus making it hard to manufacture the cable stably.

It is an object of the present invention to overcome such problems and provide a wide-band, low-loss, submarine optical cable having a structure excellent in productivity, an optical fiber unit employed in the submarine optical cable, and a method of making the optical fiber unit.

The optical fiber unit according to the present invention is employed in a submarine optical cable and comprises a loose structure which accommodates one or more coated optical fibers with a margin.

Specifically, the optical fiber unit according to a first embodiment has a plastic support provided with a space for accommodating one or more coated optical fibers. The space of this plastic support extends along a predetermined axis, and a gap between an inner wall face of the plastic support defining the space and the coated optical fibers accommodated within the space is filled with a waterproof jelly- or gel-like resin. In particular, in the optical fiber unit according to the first embodiment, one or more rigid compression members are embedded along the space in a plastic region between the inner wall face of the plastic support and an outer wall face of the plastic support defining an outer shape of the plastic support.

The optical fiber unit according to the present invention comprises a loose structure which movably accommodates coated optical fibers within a space of a plastic support. As a consequence, lateral pressures would not directly apply to the coated optical fibers, whereby loss can be kept from increasing due to microbend.

Also, since the compression members embedded in the plastic support according to the present invention are directly in contact with the plastic support, they restrict the contraction of the plastic support caused by changes in temperature or the contraction of the plastic immediately after its extrusion. Therefore, the coated optical fibers accommodated within the plastic support would not yield a surplus length more than necessary with respect to the plastic support. If the surplus length of the coated optical fibers with respect to the plastic support is too long, then the surplus length may locally concentrate as temperature repeatedly changes, thereby increasing the transmission loss. On the other hand, the compression members suppress the contraction of the plastic support, thereby functioning to restrain loss characteristics. Further, after being formed into a cable, when the cable and a repeater disposed at the bottom of sea are secured to each other, the compression members function to hold back the optical fiber unit to the housing of the repeater.

The resin filling the space of the plastic support functions to prevent seawater from entering the cable over the whole length of thereof even if a cable accident occurs at the bottom of the sea. Consequently, it is not necessary to replace the whole length of the cable, whereby the damage can be minimized.

A first method of making the optical fiber unit according to the first embodiment comprises an extrusion-molding step of extrusion-molding a plastic support having one or more rigid compression members embedded therein along a longitudinally extending space; and an introducing step of introducing into the space of the plastic support one or more coated optical fibers and a resin having such a viscosity that the coated optical fibers are radially movable therein. Here, the extrusion-molding step and the introducing step are carried out simultaneously.

According to such a method, the plastic support accommodating coated optical fibers is obtained by extrusion-molding a plastic resin. Consequently, as compared with the second conventional example produced by welding, this method can make the optical fiber unit at a higher speed, thus yielding a better productivity. Further, since the extrusion temperature of the plastic support is much lower than the welding temperature, the risk of thermal damage to the coated optical fibers accommodated within the space of the plastic support is lower, whereby this method has a higher reliability. Also, since the introducing step and the extrusion-molding step are carried out at the same time, this method can continuously make a long cable.

A second method of making the optical fiber unit according to the first embodiment comprises a first step of extrusion-molding and taking up a cylindrical plastic support having one or more rigid compression members embedded therein along a longitudinally extending space; and a second step of longitudinally cutting an outer wall of the plastic support defining the space of the plastic support and, while widening the cutout portion thus formed, introducing one or more coated optical fibers and a resin in which the coated optical fibers are radially movable.

In accordance with such a method, the extruding step of extrusion-molding the plastic support and the introducing step of introducing the coated optical fibers and the resin into the space of the plastic support are separated from each other. Therefore, even if a trouble occurs in the step of introducing the coated optical fibers and the like, the manufacture line can be stopped, adjusted, and then restarted. In particular, when a long cable such as a submarine optical cable is to be made, a delicate step of introducing coated optical fibers into a space of a plastic support is made thus stoppable so as not to produce a defective product.

While an optical fiber unit according to a second embodiment comprises a structure basically similar to that of the first embodiment, it further comprises a plastic tube accommodated within the space of the plastic support. A plurality of coated optical fibers are accommodated within this plastic tube, and a gap between an inner wall of the plastic tube and the accommodated coated optical fibers is filled with a waterproof jelly- or gel-like resin. In the optical fiber unit according to the second embodiment, as with the first embodiment, one or more rigid compression members are embedded along the space between the inner wall face of the plastic support and an outer wall face of the plastic support defining an outer shape of the plastic support.

Here, in each of the first and second embodiments, the resin filling the space of the plastic support or filling the plastic tube preferably has such a viscosity that a penetration number within the range of 80 to 1000 is yielded. It is because of the fact that, if the filling resin is too hard, then the coated optical fibers accommodated within the optical fiber unit meanders when the optical fiber unit is bent. This meandering of the coated optical fibers causes the transmission loss to increase.

Further, among the compression members embedded in the plastic support, at least a pair of selected compression members are disposed so as to sandwich the space or the plastic tube disposed within the space.

As at least a pair of compression members are thus disposed at positions opposing each other across the center axis of the plastic support, the thermal contraction force and structure of the plastic support become laterally uniform. This structure restrains the plastic support from twisting at the time when the optical fiber unit is bent.

Also, it is preferred that a plurality of compression members be disposed at each of positions opposing each other across the center axis of the plastic support. As a pair of groups each constituted by a plurality of compression members sandwich the space accommodating the coated optical fibers and the like, the outside diameter per compression member can be reduced. As a consequence, the minimum thickness of the plastic tube and that of the plastic support covering the plastic tube can be enhanced, whereby problems such as projections of the embedded compression members from the plastic support can be reduced. If the minimum thickness of each of the above-mentioned plastic members is held constant, then the outside diameter of the optical fiber unit can be reduced. Such a reduction of the diameter of the optical fiber unit can lower the total amount of the sheath material disposed at the outer periphery of the optical fiber unit, and enables the take-up drum to decrease its size. Also, a longer submarine optical cable can be taken up.

The submarine optical cable comprises an optical fiber unit having such a structure as those mentioned above, a plurality of tension members, and a waterproof structure. The plurality of tension members are disposed around the optical fiber unit. The waterproof structure is obtained by covering the optical fiber unit and the plurality of tension members with a resin layer. As the outer periphery of the optical fiber unit is provided with such an outer sheath structure, a wide-band, low-loss, submarine optical cable is obtained.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3A is a view showing a cross-sectional structure of a submarine optical cable in which a first embodiment of the optical fiber unit according to the present invention is employed, whereas

FIG. 4A is a graph indicating relationships between the surplus length ratio and the amount of increase in loss concerning a coated optical fiber employed in a ground-based optical cable and a coated optical fiber employed in a submarine optical cable, FIG. 4B is a view for explaining a cross-sectional structure of a cable having a loose structure prepared for obtaining the graph shown in FIG. 4A, FIG. 4C is a view for explaining the structure of a coated optical fiber accommodated within the cable, and FIG. 4D is a table indicating optical characteristics of the coated optical fibers prepared for obtaining the graph shown in FIG. 4A;

FIG. 5A is a graph showing a relationship between the penetration number of fillers (resins) and their waterproof characteristic, whereas

FIG. 6A is a view showing a cross-sectional structure of a first applied example of the optical fiber unit according to the first embodiment, whereas

FIGS. 8A and 8B are views showing cross-sectional structures of a head portion in the extruder in the apparatus shown in FIG. 7, in which FIG. 8A indicates the cross-sectional structure of the head portion as viewed from thereabove, whereas FIG. 8B indicates the cross-sectional structure of the head portion as viewed from a side face thereof;

FIGS. 9A and 9B are views showing a state where the optical fiber unit according to the first embodiment is wound about a drum, whereas

FIG. 11A is a view showing a device for introducing coated optical fibers and a resin into the plastic support obtained by the device shown in FIG. 10, whereas FIG. 11B is a view for explaining the introduction of the coated optical fibers and resin carried out by the device shown in FIG. 11A;

FIG. 12A is a view showing a cross-sectional structure of a submarine optical cable in which a second embodiment of the optical fiber unit according to the present invention is employed, whereas

DESCRIPTION OF THE PREFERRED EMBODIMENTS

In the following, the submarine optical cables, optical fiber units, and methods of making the same according to the present invention will be explained in detail with reference to FIGS. 3A to 6B, 7, 8A to 9C, 10, 11A to 12B, and 13 to 18. In the explanation of drawings, constituents identical to each other will be referred to with numerals identical to each other, without repeating their overlapping descriptions.

First Embodiment

Figure 1:
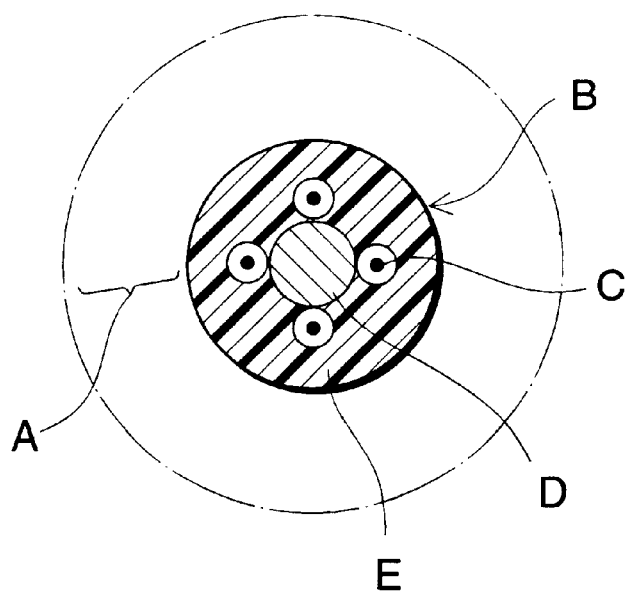
FIG. 1 is a view showing a cross-sectional structure of the submarine optical cable according to the first conventional example.
Figure 2:
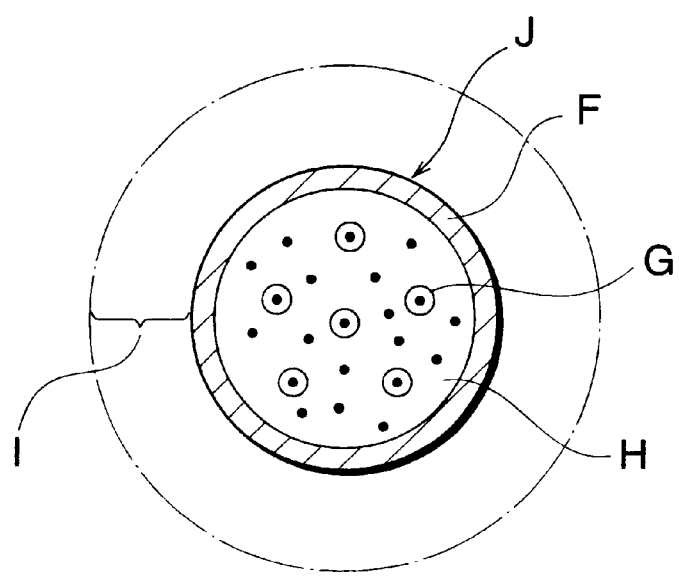
FIG. 2 is a view showing a cross-sectional structure of the submarine optical cable according to the second conventional example.
Figure 3A:
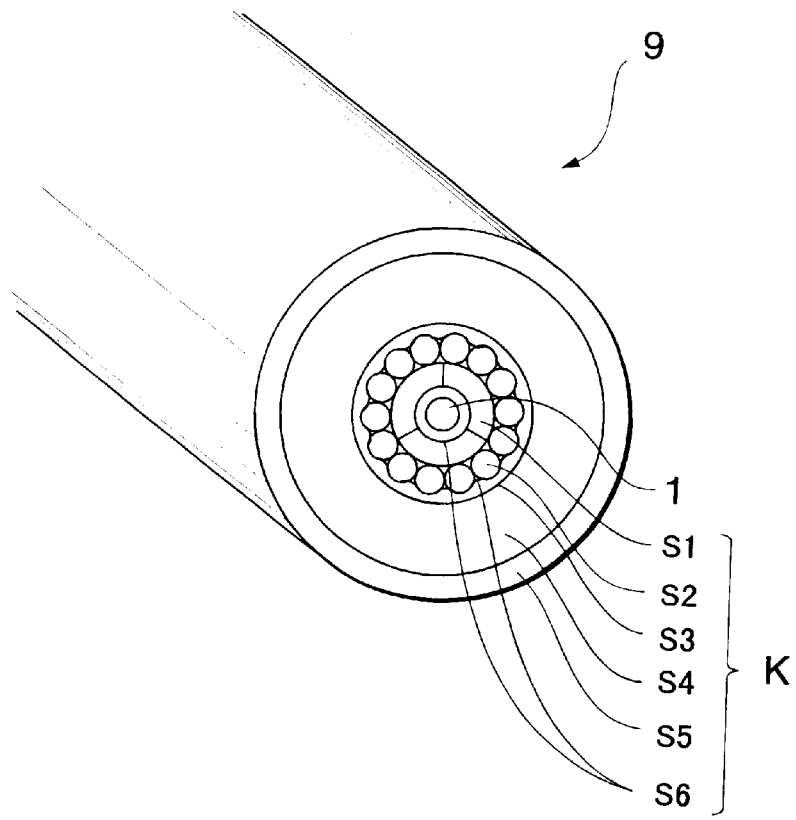
Figure 3B:
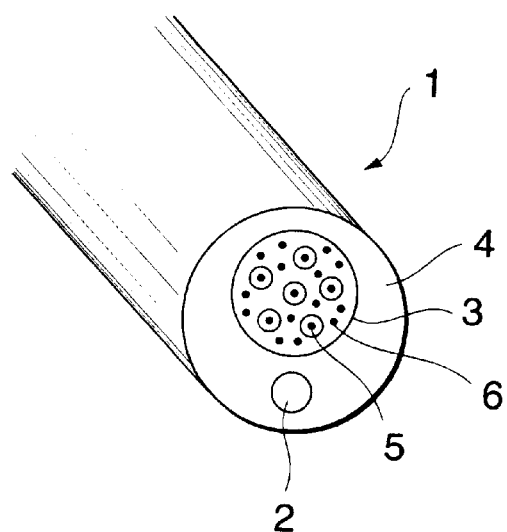
FIG. 3B is a view showing a cross-sectional structure of the optical fiber unit according to the first embodiment.

FIG. 3A is a view showing a cross-sectional structure of a submarine optical cable 9 in which a first embodiment of the optical fiber unit 1 according to the present invention is employed, whereas FIG. 3B is a view showing a cross-sectional structure of the optical fiber unit 1. In FIG. 3A, the optical fiber unit 1 is disposed on the center axis of the submarine optical cable 9. Around the outer periphery of the optical fiber unit 1, the following multilayer outer sheath structure K is disposed: a layer of tension members S2, a water-running prevention compound S6, a three-part split iron pipe S1, a copper tube S3, a waterproof structure comprising a low-density polyethylene layer S4 and a high-density polyethylene layer S5. The optical fiber unit 1 comprises a cylindrical plastic support 4 having a longitudinally extending space 3 and a rigid compression member 2 embedded therein along the space 3. The space 3 in the plastic support 4 is filled with coated optical fibers 5 and a jelly- or gel-like resin 6 having such a viscosity that the coated optical fibers 5 are radially movable therein.

The coated optical fibers 5 are loosely accommodated within the space 3 having a diameter of 1.8 mm provided in the plastic support 4 having a diameter of 2.8 mm made of polyethylene, nylon, Hytrel, polybutadiene terephthalate (PBT), or the like. Therefore, no lateral pressures directly apply to the coated optical fibers 5, whereby loss can be kept from increasing due to microbend. Further, since the outer periphery of the optical fiber unit 1 is provided with the outer sheath structure K comprising the water-running prevention compound, tension members, polyethylene layers, and the like, it has a configuration which endures an environment in the deep sea such as that mentioned above. Each coated optical fiber 5 comprises a silica-based glass fiber (which comprises a core portion and a cladding portion) with a diameter of 125 μm, and a coating layer with an outside diameter of 0.25 mm composed of a UV-curable resin having a lower Young's modulus and a UV-curable resin having a higher Young's modulus which are successively laminated on the outer periphery of the silica-based glass fiber.

The compression member 2 is made of a cylindrical or planar wire material having a diameter of 0.6 mm formed from steel or FRP, and restricts the contraction of the plastic support 4 upon temperature changes or the contraction of the plastic support 4 immediately after the extrusion thereof. Therefore, the coated optical fibers 5 accommodated within the space 3 would not yield a surplus length more than necessary with respect to the plastic support. If the coated optical fibers 5 are too long with respect to the plastic support 4, then loss will increase due to the meandering of coated optical fibers 5 in the space 3. If temperature is repeatedly changed, then the surplus length of the coated optical fibers 5 tends to locally concentrate within the space 3, thereby further increasing the transmission loss. The compression member 2 suppresses the contraction of the plastic support 4, thereby functioning to effectively restrain the increase of loss in the coated optical fibers 5 accommodated within the space 3. Also, after being formed into a cable, when the cable and a repeater at the bottom of sea are secured to each other, the compression member 2 functions to hold back the optical fiber unit 1 to the housing of the repeater.

FIG. 4A is a graph showing the relationship between the surplus length ratio (%) and the amount of increase in loss $\Delta\alpha$ (mdB/km) in each of a coated optical fiber Fa employed in a ground-based optical cable and a coated optical fiber Fb employed in a submarine optical cable. In this measurement, two kinds of optical fiber units, i.e., one accommodating a plurality of coated optical fibers Fa and the other accommodating a plurality of coated optical fibers Fb, were prepared. Each optical fiber unit comprises, as shown in FIG. 4B, a plastic tube 40 having an outside diameter of 3.0 mm and an inside diameter of 2.0 mm, coated optical fibers 5 accommodated in the space within the plastic tube 40, and a jelly-like resin 6 filling the space together with the coated optical fibers 5. The filling resin in each optical fiber unit is Syncofox LF385-ND (jelly-like resin). Also, the share of fibers is 19% in each of the optical fiber unit. Here, the share of fibers is given by the ratio of the total cross-sectional areas of a plurality of coated optical fibers 5 accommodated in a spatial area defined at an inside diameter of 2.0 mm to the cross-sectional area of this spatial area.

In each accommodated coated optical fiber 5, as shown in FIG. 4C, the outer periphery of an optical fiber is covered with a resin layer 53 having a multilayer structure. The optical fiber comprises a core portion 51 extending along a predetermined axis and a cladding portion 52 disposed at the outer periphery of the core portion 51. The coated optical fiber Fa prepared for this measurement is an optical fiber employed in a submarine optical cable. Specifically, as shown in FIG. 4D, the coated optical fiber Fa is a dispersion-shifted optical fiber (DSF) and has, with respect to light in a 1.5-μm wavelength band, an effective area of 84 $\mu m^2$, a dispersion of −2.3 ps/nm/km, and a dispersion slope of 0.09 $ps/nm^2/km$. On the other hand, the coated optical fiber Fb prepared for this measurement is an optical fiber employed in a ground-based optical cable. Specifically, as shown in FIG. 4D, the coated optical fiber Fb is a single-mode optical fiber (SMF) having a zero-dispersion wavelength in a 1.3-μm wavelength band and has, with respect to light in the 1.5-μm wavelength band, an effective area of 63 $\mu m^2$, a dispersion of 16 ps/nm/km, and a dispersion slope of 0.06 $ps/nm^2/km$.

As can be seen from FIG. 4A, the coated optical fiber Fa employed in the submarine optical cable has a greater loss fluctuation with respect to changes in surplus length ratio as compared with the coated optical fiber Fb employed in the ground-based optical cable. Here, the surplus length ratio is given by the ratio of the length of the coated optical fiber 5 accommodated within the plastic tube 40 to the length of the plastic tube 40. The surplus length ratio heavily depends on the changes in length caused by the contraction and expansion of the plastic tube 40, and it can be seen that the fluctuation in surplus length ratio affects the transmission quality more in the submarine optical cable than in the ground-based optical cable.

Also, in the first embodiment, since the space 3 of the plastic support 4 is filled with the jelly- or gel-like resin 6, lateral pressures 6 would not apply to the coated optical fibers 5 accommodated therein. The existence of the resin 6 effectively prevents seawater from entering the cable over the whole length thereof even if a cable accident occurs at the bottom of the sea. Consequently, it is not necessary to replace the whole length of the cable, whereby the damage can be minimized.

The resin 6 filling the space 3 includes a thermosetting or UV-curable silicone gel having a Young's modulus of 0.1 $kg/mm^2$; and a jelly-like admixture in which rubber such as that of butadiene, silicone, or the like is swelled with an oil such as that of silicone, naphthene, or the like and a filler is added thereto when necessary. Such a resin 6 has such a viscosity that the coated optical fibers 5 are radially movable therein. This characteristic enables the cable to bend without excessively applying tension to the coated optical fibers 5, thus being able to fully deal with the installation of the cable and the like. Also, the resin 6 must effectively suppress the increase in loss locally occurring due to the nonuniform concentration of surplus length of coated optical fibers 5 within the space 3. Therefore, the filling resin 6 preferably has not only such a viscosity that at least it does not naturally flow, but also a thixotropic property by which it deforms upon gentle external forces and exhibits a restorability against abrupt external forces.

Figure 5A:
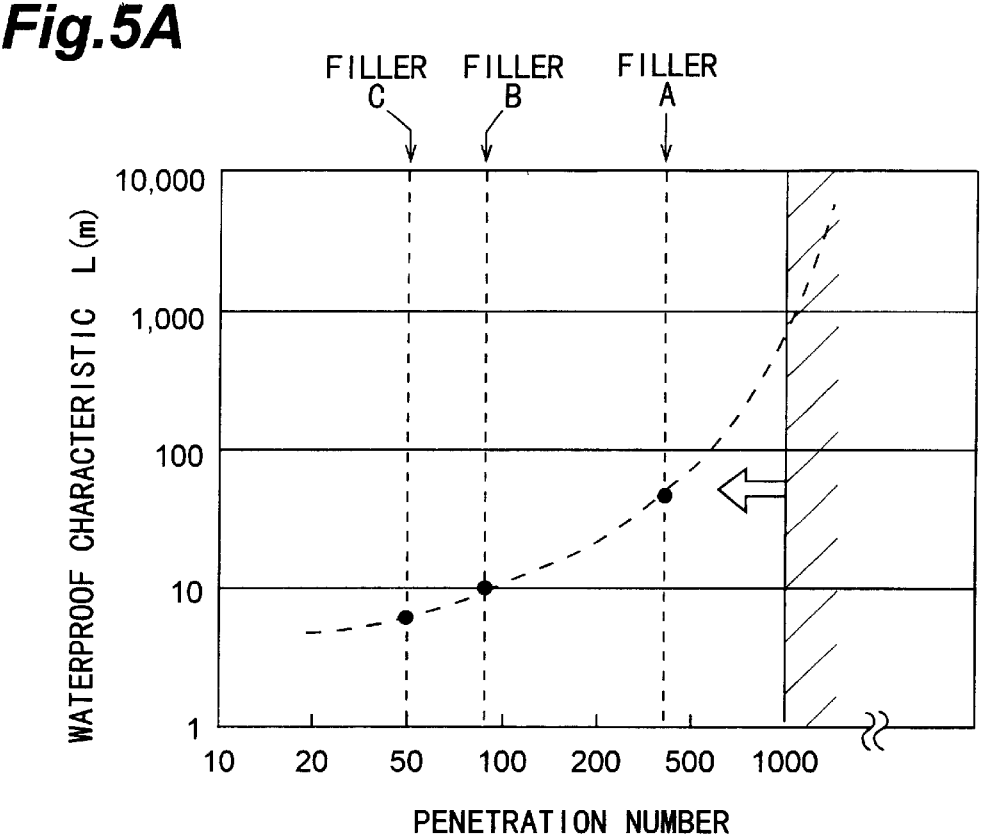
Figure 5B:
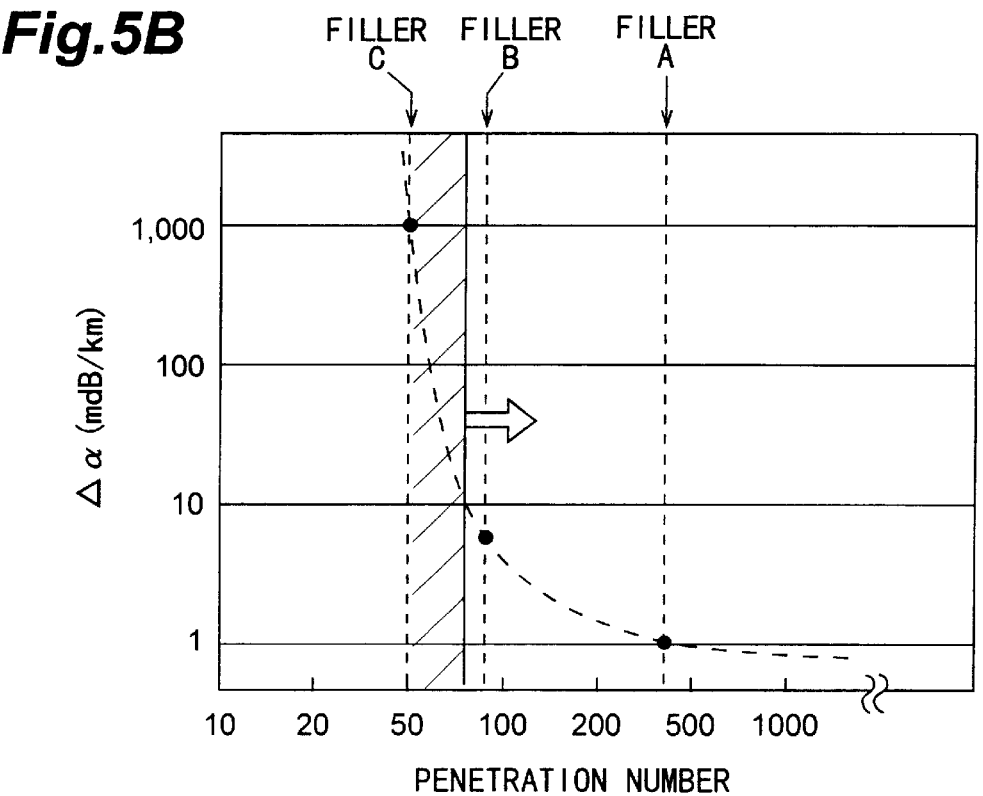
FIG. 5B is a graph showing a relationship between the penetration number of the fillers (resins) and their amount of increase in loss.

FIGS. 5A and 5B show results of studies concerning the range of viscosity of the resin 6 filling the space 3 of the optical fiber unit 1, in which FIG. 5A is a graph showing a relationship between the penetration number of resins and their waterproof characteristic (m), whereas FIG. 5B is a graph showing a relationship between the penetration number of the resins and their amount of increase in loss.

In this measurement, three kinds of samples (optical fiber units) were prepared. As shown in FIG. 4B, each sample has a plastic tube 40 with an inside diameter of 2.0 mm and an outside diameter of 3.0 mm, a plurality of coated optical fibers 5 (see FIG. 4D) for a submarine optical cable inserted in the plastic tube 40, and a resin 6 filling the plastic tube 40. The share of fibers is 19% in each of the samples. Three kinds of filling resins were used in the measurement: Syncofox LF385-ND (jelly-like filler A), and TSE3051 (filler B; silicone gel) and TSE3062 (filler C; silicone gel) both manufactured by Toshiba Silicone Co., Ltd.

Here, the penetration number indicated by the abscissa of FIG. 5A refers to the density of each sample expressed by the depth by which a reference needle enters the sample under the test condition of a designated ASTM standard, whereas the waterproof characteristic indicated by the ordinate refers to the length of the sample required for preventing the coated optical fibers 5 and resin 6 within the plastic tube 40 from leaking out from one end portion of the sample when a pressure of 9.8 MPa is applied to the other end portion.

As can be seen from the graph of FIG. 5A, as the penetration number of fillers (resins) increases (resin viscosity decreases), a longer plastic tube is necessary for preventing the fillers and the like from leaking out. Since an actual submarine optical cable is constituted by a plurality of units each having a length on the order of 1000 to 5000 m, the filler resin preferably has a penetration number of 1000 or less.

On the other hand, Δα indicated by the ordinate of FIG. 5B is the amount of increase in loss when each of the prepared sample is bent into a diameter of 1000 mm from a linear state.

As can be seen from FIG. 5B, as the penetration number of fillers (resins) decreases (resin viscosity increases), the amount of increase in loss Δα increases. It is presumed to be because of the fact that the coated optical fibers 5 meander when the plastic tube 40 is bent if the resin filling the plastic tube 40 has a high viscosity. Namely, it is considered to be due to the fact that, when the resin 6 has a higher viscosity, the movement of the accommodated coated optical fibers 5 in the longitudinal direction thereof is restricted by this resin 6. Therefore, in order for the loss increase amount Δα to lie within a practically permissible range of 10 mdB/km or less, the resin filling the optical fiber unit 1 preferably has a penetration number of 80 or greater.

Here, as compared with the coated optical fibers for a ground-based optical cable, the coated optical fibers for a submarine optical cable have a lower resistance with respect to lateral pressures. Therefore, the share of optical fibers in the submarine optical cable is designed so as to become smaller than that in the ground-based optical cable.

Figure 6A:
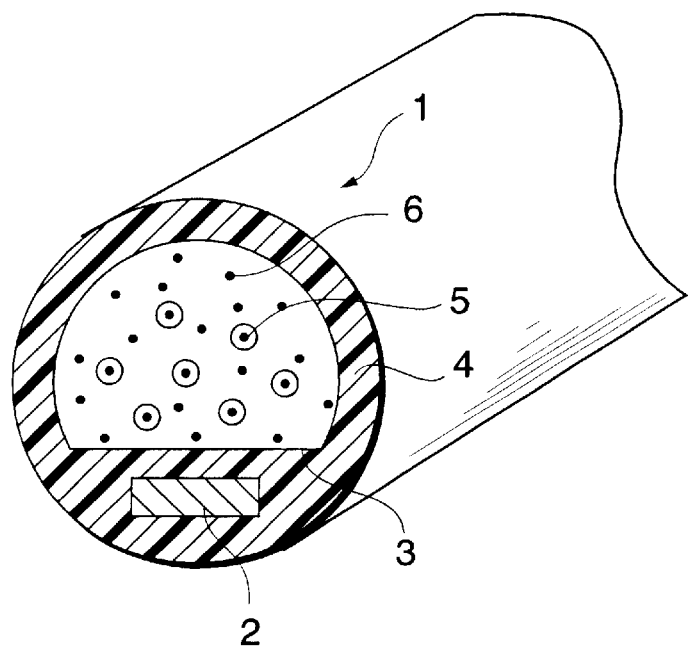
Figure 6B:
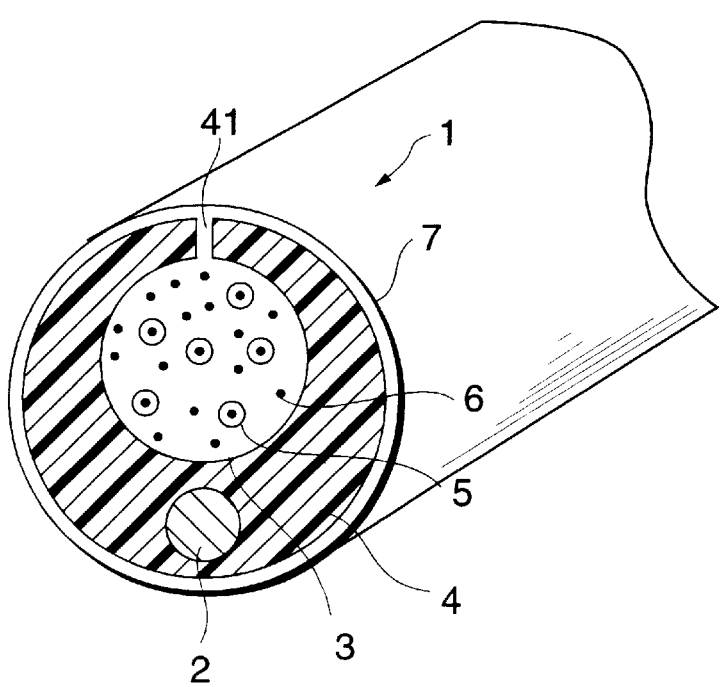
FIG. 6B is a view showing a cross-sectional structure of a second applied example of the optical fiber unit according to the first embodiment.

FIGS. 6A and 6B are views showing respective cross-sectional configurations of applied examples of the optical fiber unit 1 according to the first embodiment. In the first applied example shown in FIG. 6A, the space 3 has a semicircular cross-sectional form, whereas the compression member 2 has a rectangular cross-sectional form. As a consequence of such a configuration, the coated optical fibers 5 can be accommodated within the space 3 with a high density. One of very important issues in submarine optical cables is to reduce their outside diameter, so as to cut down the cost thereof. Such a configuration enables the coated optical fibers 5 to be accommodated with a high density.

In the second applied example shown in FIG. 6B, the outer wall of the plastic support 4 forming the space 3 is provided with a cutout portion 41, and the outer periphery of the plastic support 4 is covered with a wrapping tape 7. The other parts have a structure identical to that shown in FIG. 3B. The cutout portion 41 is used for introducing the coated optical fibers 5 and the resin 6 through its gap into the space 3 while widening the gap. For holding thus introduced coated optical fibers 5 and resin 6 within the space 3, the whole outer periphery of the plastic support 4 is covered with the wrapping tape 7. The wrapping tape 7 of the cutout portion 41 will be explained later.

Figure 7:
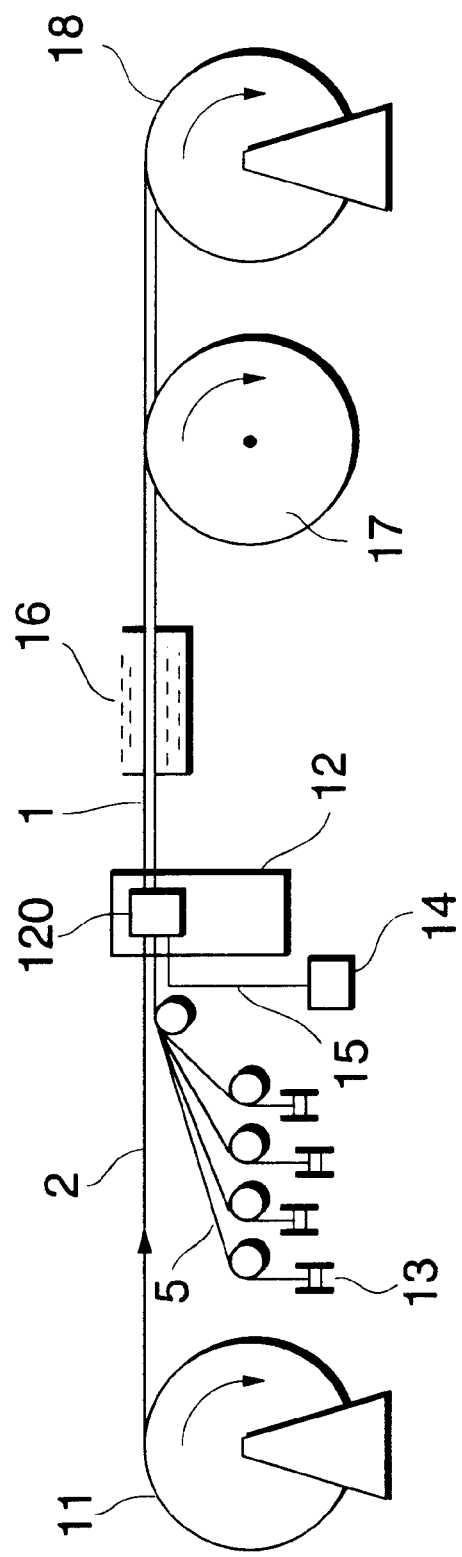
FIG. 7 is a view showing the configuration of an apparatus for making the optical fiber unit according to the first embodiment.

For carrying out the making (first manufacturing method) of the optical fiber unit 1 shown in FIG. 3B, the apparatus shown in FIG. 7 is employed. This apparatus comprises a feed drum 11 for supplying a compression member 2, and an extruder 12 for extrusion-molding a plastic support 4 having a longitudinally extending space 3 and having embedded therein the compression member 2 supplied from the feed drum 11 (extrusion-molding step). Into the space 3 of the plastic support 4, coated optical fibers 5 are supplied from their respective bobbins 13, and a resin 6 having such a viscosity that the coated optical fibers 5 are radially movable therein is introduced from a resin feeder 14 by way of a pipe 15 (introducing step). As these steps are carried out simultaneously, the optical fiber unit 1 is obtained. The optical fiber unit 1 thus formed is passed through a cooling water bath 16, and then is pulled by a pulling device 17 at a predetermined speed so as to be wound about a take-up drum 18.

FIGS. 8A and 8B are views showing in detail the inner structure of a head portion 120 of the extruder 12 shown in FIG. 7, in which FIG. 8A indicates a cross-sectional structure of the head portion 120 as viewed from above the extruder 12, whereas FIG. 8B indicates a cross-sectional structure of the head portion 120 as viewed from a side face of the extruder 12.

As can be seen from these cross-sectional views, the head portion 120 has a double structure in which an inner member 126 having a through hole is accommodated within a body member 127 having an inlet 122 for a plastic material. The plastic material introduced from the inlet 122 flows through the gap between the body member 127 and the inner member 126, so as to be extruded out of an opening 253 defined by a die 128. A waterproof jelly- or gel-like resin flows through the through hole of the inner member 126, so as to be extruded out of an opening 212 located at the tip of the inner member 126. Attached to the inner member 126 from therebehind is a rear member 125 having an injection slot 121 into which the resin is introduced. The rear member 125 has an inner space communicating with the through hole of the inner member 126, so that the injected resin is introduced into the through hole of the inner member 126 by way of this inner space. Such a double structure of the head portion 120 yields the plastic member 4 having a space 3 filled with the resin 6.

The inner space of the rear member 125 is provided with a fiber introducing pipe 210 communicating the outside of the head portion 120 to the through hole of the inner member 126. A plurality of coated optical fibers 5 introduced from the opening 211 of the fiber introducing pipe 210 are guided into the through hole of the inner member 126 filled with the resin. Further, a pipe 200 for introducing one or more compression members 2 penetrates through the inner space of the rear member 125. The tip of the pipe 200 penetrates through the inner space of the rear member 125 and the through hole of the inner member 126 so as to reach the tip of the inner member 126. The compression member 2 introduced from the rear opening 201 of the pipe 200 is guided to the tip of the inner member 126 without coming into contact with the resin, so as to reach, by way of the tip opening 202 of the inner member 126, the space where the plastic material exists. This configuration yields the plastic support 4 in which the compression member 2 is embedded. Though FIGS. 8A and 8B show the head portion 120 equipped with two pipes 200 for introducing compression members 2, one of them may be utilized alone. When the two pipes 200 are utilized, then at least two compression members are arranged so as to sandwich the space filled with the resin 6. Also, a plurality of compression members may be introduced into each pipe 200.

In the manufacturing method carried out by the apparatus shown in FIG. 7, since the plastic support 4 accommodating the coated optical fibers 5 is extrusion-molded, it can be made at a higher speed with a resultant better productivity as compared with the case of the metal tube according to the second conventional example produced by welding. Also, since the extrusion temperature of the plastic support 4 is much lower than the welding temperature of a metal, the risk of thermal damage to the coated optical fibers 5 accommodated within the space 3 is lower. Further, since the introducing step and the extrusion-molding step are carried out at the same time, this manufacturing method can continuously make a long cable.

Figure 9A:
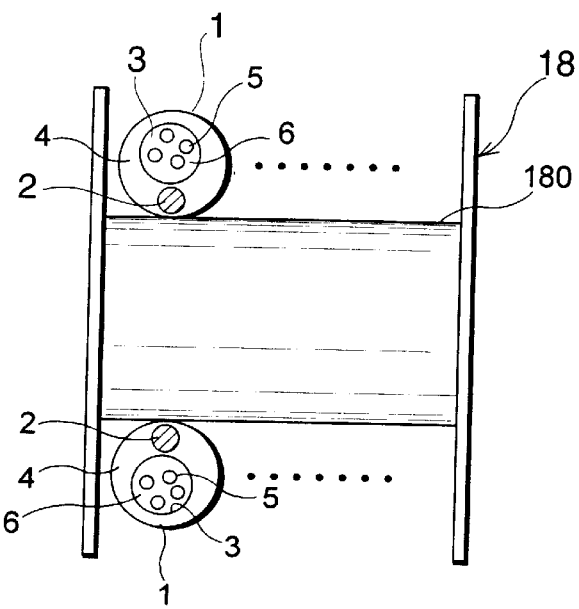

FIG. 9A is a view showing a state where the optical fiber unit 1 is wound about the take-up drum 18. The optical fiber unit 1 is wound about the body portion 180 of the drum 18 such that the compression member 2 is located closer to the body portion 180 than is the space 3. If the space 3 is located closer to the body portion 180 than is the compression member 2, then the compression member 2 is likely to move toward the body portion 180, thus unfavorably affecting, the optical fiber unit 1 to have an residual tendency bend. When the compression member 2 is wound about the body portion 180 so as to be located on the inner side from the space 3 as shown in FIG. 9A, on the other hand, the length of each round of coated optical fiber 5 introduced in the space 3 about the body portion 180 becomes greater than the length of each round of the compression member 2 about the body portion 180, whereby the coated optical fiber 5 becomes longer than the compression member 2 as a whole. As the optical fiber length becomes longer, optical fibers are more likely to meander within the optical fiber unit 1 upon forming a cable. Therefore, when winding the optical fiber unit 1 about the take-up drum 18, the coated optical fibers 5 are placed in a state where they are slightly stretched with respect to the compression member 2. This state is realized by applying a tension to the coated optical fibers 5 or setting the temperature of the coated optical fibers 5 such that they are stretched so as to become longer than the compression member 2 when the coated optical fibers 5 are introduced into the space 3.

Further, the inventors have studied how much the compression member 2 contributes to preventing the plastic support 4 from shrinking. The sample prepared as a comparative example is an optical fiber unit having an outside diameter of 3.0 mm in which no compression member is embedded in the plastic tube 40 as shown in FIG. 4B. On the other hand, the sample prepared as the optical fiber unit of the first embodiment is an optical fiber unit in which two compression members are embedded in the plastic tube 40 so as to sandwich the space 3.

Figure 9B:
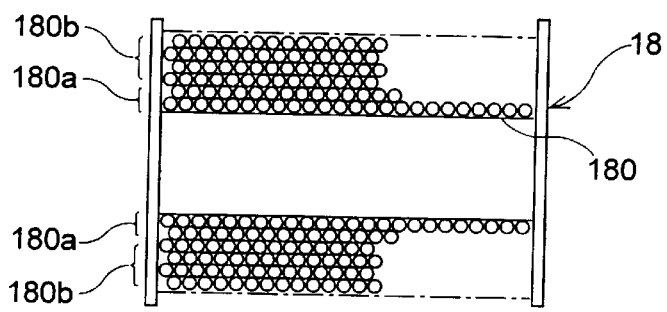
Figure 9C:
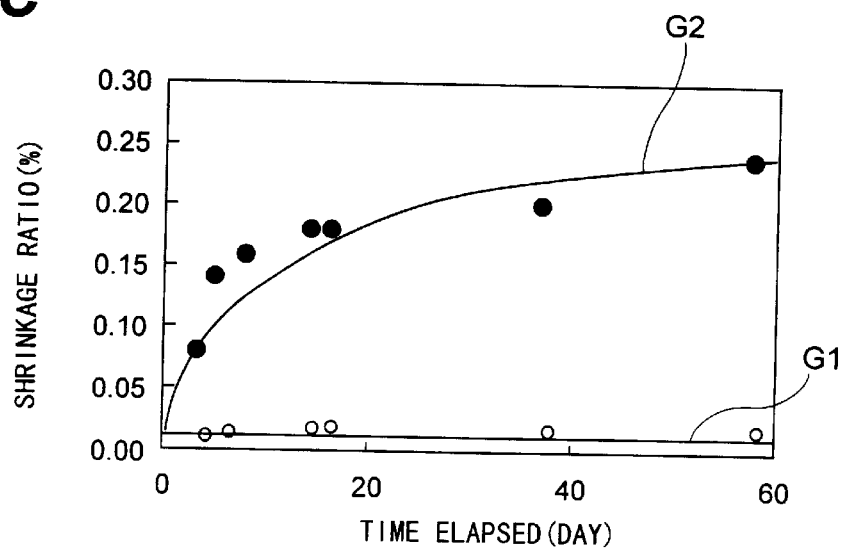
FIG. 9C is a graph showing temporal changes in the ratio of shrinkage in an optical fiber unit in which two compression members are embedded and an optical fiber unit in which no compression member is embedded.

Each of the manufactured optical fiber unit is stored in the state wound about the body portion 180 of the drum 18 as shown in FIG. 9B. Usually, once an optical fiber unit is made, it is stored in the state shown in FIG. 9B until an outer sheath is applied thereto for forming a cable. Since the body portion 180 itself functions as a compression member even when a certain period of time has passed after the optical fiber unit is wound about the drum 18, the part of optical fiber unit 180a near the body portion 180 can relatively suppress the tube shrinkage. The surface layer 180b of optical fiber unit, by contrast, slackens over time, so that tensions are less likely to apply thereto. FIG. 9C shows a curve G1 corresponding to the sample in which two compression members are embedded in the plastic tube 40, and a curve G2 corresponding to the comparative sample in which no compression member is embedded in the plastic tube 40.

It can be seen from FIG. 9C that, in the optical fiber unit with no compression member, the part near the surface layer 180a in the optical fiber unit wound about the drum body portion 180 shrinks by 0.2% or more (curve G2). On the other hand, the tube hardly changes over time in the sample in which two compression members are embedded (curve G1). The increase of loss in the coated optical fiber 5 accompanying such a shrinkage of the plastic tube 40 is shown in FIG. 4A. According to FIG. 4A, a tube shrinkage of 0.2% does not yield any significant increase of loss in the optical fiber Fb employed in a ground-based cable. By contrast, the tube shrinkage of 0.2% renders a critical increase of loss to the optical fiber Fa employed in a submarine optical cable. It is preferred that the optical fiber unit employed in a submarine optical cable have a structure in which the tube shrinkage occurring over time can effectively be suppressed due to the existence of compression members.

Figure 10:
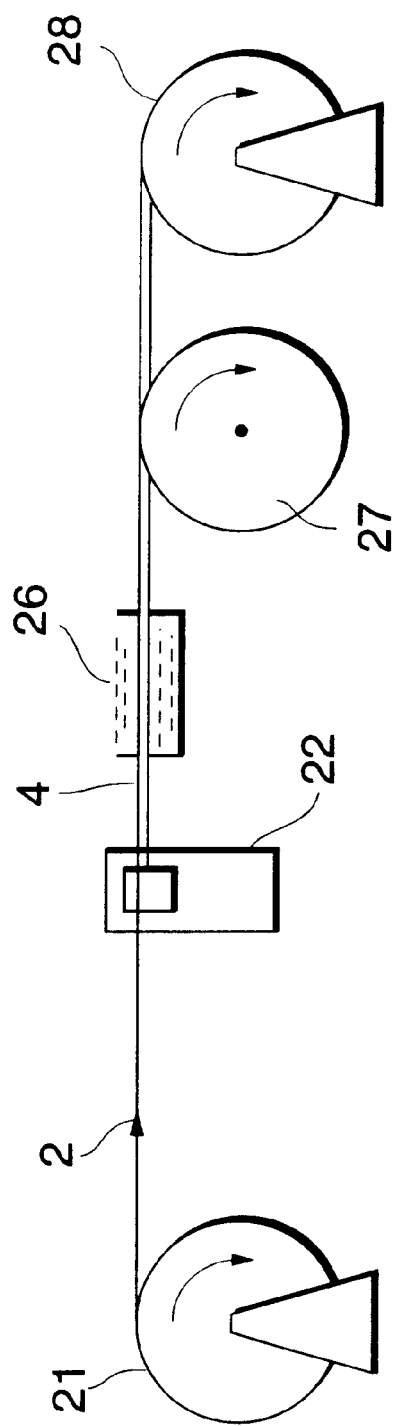
FIG. 10 is a view showing the configuration of a device for extrusion-molding a plastic support in an apparatus for making the second applied example (FIG. 6B) of the optical fiber unit according to the first embodiment.

The making of the optical fiber unit shown in FIG. 6B (second manufacturing method) will now be explained. For making such an optical fiber unit, the apparatus shown in FIGS. 10 and 11A is used. FIG. 10 shows a device for extrusion-molding a plastic support 4; which comprises a feed drum 21 for supplying a compression member 2, and an extruder 22 for extrusion-molding the plastic support 4 having a longitudinally extending space 3 and having embedded therein the compression member 2 supplied from the feed drum 21 (extrusion-molding step). Thus extrusion-molded plastic support 4 is subsequently passed through a cooling water bath 26, and then is pulled by a pulling device 27 at a predetermined speed so as to be wound about a take-up drum 28.

FIG. 11A shows a device for introducing coated optical fibers 5 and a resin 6 into the plastic support 4 wound about the take-up drum 28; which comprises a feed drum 31 for supplying the plastic support 4, a cutter 30 for longitudinally cutting the outer wall forming the space 3 of the plastic support 4 supplied from the feed drum 31, and wedge-like spacers 32 to be inserted into the cutout portion 41 thus formed so as to widen the gap of the cutout portion 41. As shown in FIG. 11B, the cutout portion 41 is widened by the spacers 32, whereas the coated optical fibers 5 and the resin 6 are introduced from thus widened cutout portion 41. While the coated optical fibers 5 are supplied into the space 3 from their respective bobbins 33 by way of the cutout portion 41, the resin 6 having such a viscosity that the coated optical fibers 5 are radially movable therein is injected from a resin feeder 34 by way of a pipe 35 (introducing step). Subsequently, a wrapping tape 7 is applied to the outer periphery of the plastic support 4 by a wrapping device 36, whereby the optical fiber unit 1 having the structure shown in FIG. 6B is formed. The optical fiber unit 1 thus formed is pulled by a pulling device 37 at a predetermined speed so as to be wound about a take-up drum 38.

As the wrapping tape 7 for holding the coated optical fibers 5 and resin 6 introduced from the cutout portion 41 of the plastic support 4 within the space 3, it is preferred that, in the case where the resin 6 is a jelly-like admixture, a tape such as that of PET or the like be wound in an overlapping fashion. In the case where the resin is not a jelly-like admixture but silicone gel or the like, a tape such as that of PET or a string such as Kevlar string may be wound at a predetermined pitch or the cutout portion 41 may locally be heated so as to be fused, thus yielding a smaller diameter. Silicon gel is excellent in heat resistance, thereby being highly reliable against the rise of inner core temperature (120° C.) at the cable sheath extrusion step for forming the unit into a cable. Also, since it has substantially no fluidity, there is no fear of it being moving in the lengthwise direction of the optical fiber over a long period.

In the manufacturing method realized by the apparatus of FIGS. 10 and 11A, the extruding step of extrusion-molding the plastic support 4 and the introducing step of introducing the coated optical fibers 5 and the resin 6 into the space 3 of the plastic support 4 are separated from each other. Therefore, even if a trouble occurs in the step of introducing the coated optical fibers and the like, the manufacture line can be stopped, adjusted, and then restarted. In particular, when a long cable such as a submarine optical cable is to be made, a delicate step of introducing the coated optical fibers 5 into the space 3 is made thus stoppable so as not to produce a defective product.

As explained in the foregoing, the optical fiber unit according to the first embodiment comprises a loose structure in which coated optical fibers are movably accommodated within a space of a plastic support. As a consequence of this loose structure, lateral pressures would not directly apply to the coated optical fibers, whereby loss can be kept from increasing due to microbend. Also, since one or more compression members are embedded in the plastic support, the contraction of the plastic support due to changes in temperature is suppressed, whereby the increase in loss locally concentrated as temperature repeatedly changes is effectively restrained.

When such an optical fiber unit is employed in a submarine optical cable, a sufficient transmission quality can be secured.

When the step of extrusion-molding the plastic support and the step of introducing the coated optical fibers and the resin into the space of the plastic support are carried out separately from each other; if a trouble occurs, it can easily be dealt with.

Second Embodiment

Figure 12A:
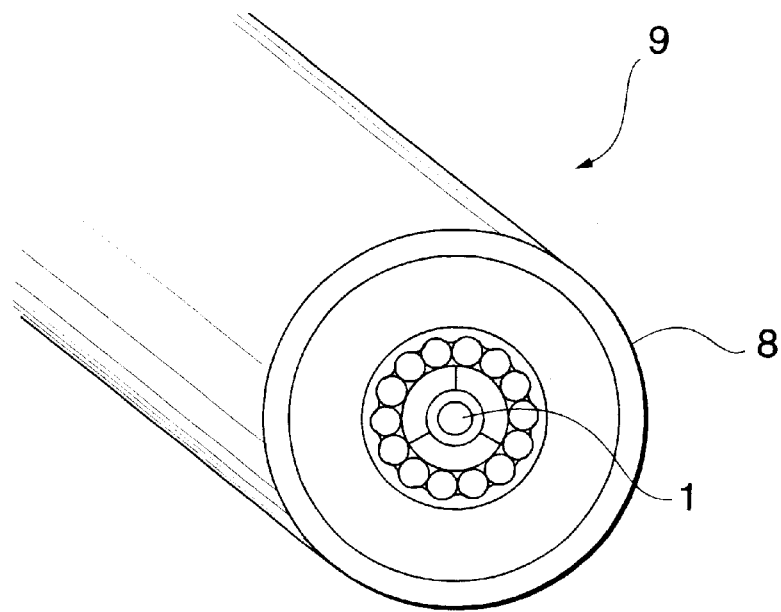
Figure 12B:
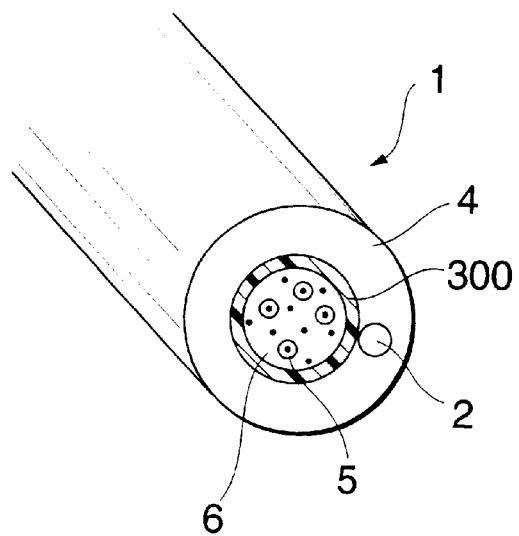
FIG. 12B is a view showing a cross-sectional structure of the optical fiber unit according to the second embodiment.

FIG. 12A is a sectional view of a submarine optical cable employing the optical fiber unit according to a second embodiment, whose basic structure is similar to that of the submarine optical cable shown in FIG. 3A employing the optical fiber unit according to the first embodiment, whereas FIG. 12B is a sectional view of the optical fiber unit according to the second embodiment. In FIG. 12, the optical fiber unit 1 according to the second embodiment comprises a plastic tube 300, coated optical fibers 5 loosely accommodated within the tube 300 with a predetermined slack, and a waterproof resin 6 accommodated together with the coated optical fibers 5. The optical fiber unit 1 according to the second embodiment further comprises a compression member 2 disposed outside the tube 300 in parallel with the coated optical fibers 5, and a plastic support 4 disposed in close contact with the tube 300 while in a state where the compression member 2 is embedded therein. As mentioned above, the resin 6 has such a viscosity that the penetration number lies within the range of 80 to 1000, and includes a gel- or jelly-like resin.

The coated optical fibers 5 are accommodated, together with the resin 6, in the tube 300 having an outside diameter of 1.9 mm and an inside diameter of 1.8 mm made of polyethylene, nylon, Hytrel, polybutadiene terephthalate (PBT), or the like. Therefore, no lateral pressures directly apply to the coated optical fibers 5, whereby loss can be kept from increasing due to microbend. The compression member 2 having a diameter of 0.35 mm made of a steel wire or FRP is longitudinally attached to the outside of the tube 300, and the plastic support 4 having an outside diameter of 3 mm made of polyethylene nylon, Hytrel, polyvinyl chloride, PBT, or the like is disposed at their outer periphery, whereby the optical fiber unit 1 is formed.

Further, an outer sheath structure 8 comprising a water-running prevention compound, tension members, polyethylene sheaths, and the like is disposed at the outer periphery of the optical fiber unit 1, whereby a submarine optical cable 9 is formed (see FIGS. 3A and 12A).

As shown in FIG. 4C, each coated optical fiber 5 comprises a silica-based glass fiber (which comprises a core portion 51 and a cladding portion 52) with a diameter of 125 μm, and a coating layer 53 with an outside diameter of 0.25 mm, composed of a UV-curable resin having a lower Young's modulus (first layer) and a UV-curable resin having a higher Young's modulus (second layer), covering the outer periphery of the silica-based glass fiber.

The compression member 2, having a diameter of 0.35 mm made of a steel wire or FRP, restricts the contraction of the plastic tube 300 or plastic support 4 upon temperature changes or the contraction thereof after the extrusion. Therefore, the coated optical fibers 5 accommodated within the tube 300 would not yield a surplus length more than necessary (see FIG. 9C). If the surplus length of the coated optical fibers 5 is too long with respect to the tube 300, then loss will increase due to meandering. If temperature is repeatedly changed, then the surplus length tends to locally concentrate, thereby further increasing the transmission loss. The compression member 2 suppresses the contraction of the tube 300 or plastic support 4, thereby functioning to effectively restrain loss characteristics. Also, after being formed into a cable, when the cable and a repeater disposed at the bottom of sea are secured to each other, the compression member 2 functions to hold back the optical fiber unit 1 to the housing of the repeater.

The resin 6 accommodated within the tube 300 effectively prevents seawater from entering the cable over the whole length thereof even if a cable accident occurs at the bottom of the sea. Consequently, it is not necessary to replace the whole length of the cable, whereby the damage can be minimized.

The resin 6 includes a thermosetting or UV-curable silicone gel having a Young's modulus of 0.1 kg/mm$^2$; and a jelly-like admixture in which rubber such as that of butadiene, silicone, or the like is swelled with an oil such as that of silicone, naphthene, or the like and a filler is added thereto when necessary. Such a resin 6 has such a viscosity that the coated optical fibers 5 are radially movable therein, whereby the cable can be bent without excessively applying tension to the coated optical fibers 5. Also, for suppressing the increase in loss locally occurring due to the nonuniform concentration of surplus length of coated optical fibers 5 in the lengthwise direction, the filling resin 6 preferably has not only such a viscosity that at least it does not naturally flow, but also such a property that it deforms upon gentle external forces and exhibits a restorability against abrupt external forces.

Figure 13:
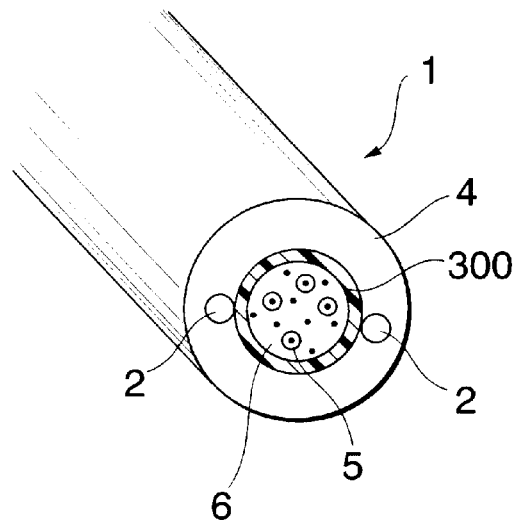
FIG. 13 is a view showing a cross-sectional structure of a first applied example of the optical fiber unit according to the second embodiment.

FIG. 13 is a sectional view showing a configuration of a first applied example of the optical fiber unit 1 according to the second embodiment. In the optical fiber unit 1 of FIG. 13, two compression members 2 are embedded in the plastic support 4. These two compression members 2 are disposed at positions opposing each other across the center axis of the tube 300. As the compression members 2 are disposed at positions opposing each other across the center axis of the tube 300, the thermal contraction force of the plastic support 4 or the cross-sectional structure of the optical fiber unit 1 becomes laterally uniform, whereby the optical fiber unit 1 is effectively restrained from twisting when bent.

Figure 14:
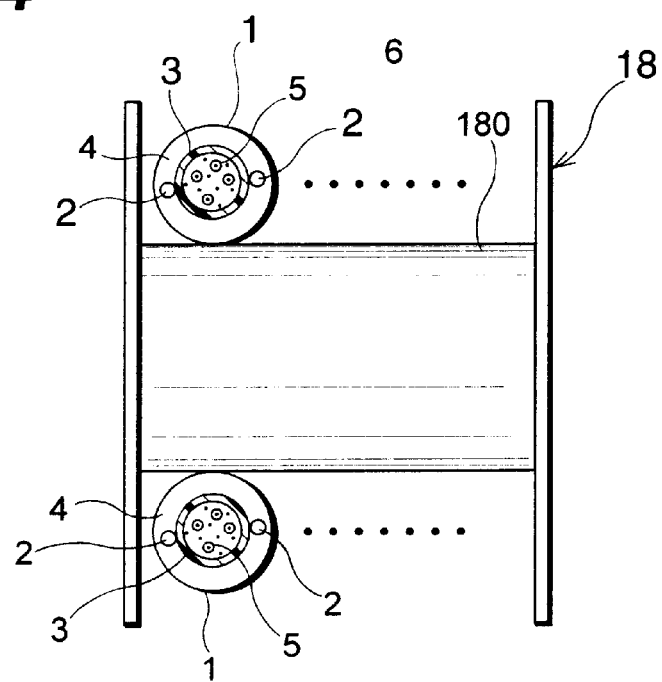
FIG. 14 is a view showing a state where the optical fiber unit shown in FIG. 13 is wound about a drum.

FIG. 14 shows a state where the optical fiber unit 1 is wound about the body portion 180 of a drum 18. In the optical fiber unit 1 shown in FIG. 13, the two compression members 2 are preferably wound about the body portion 180 of the drum 18 so as to yield the same radius of curvature with respect to the body portion 180. Since loads equally apply to the two compression members 2, the optical fiber unit 1 is effectively prevented from twisting. The same relationship between the compression members 2 and the bending direction is kept in the case where the submarine optical cable 9 is wound about the drum 18 or on a floor surface.

Figure 15:
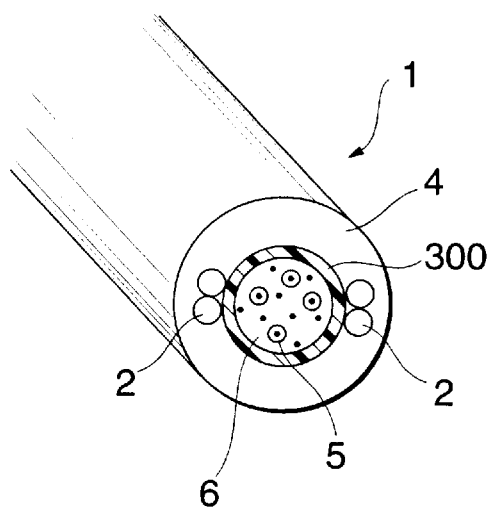
FIG. 15 is a view showing a cross-sectional structure of a second applied example of the optical fiber unit according to the second embodiment.

FIG. 15 is a sectional view showing a second applied example of the optical fiber unit 1 according to the second embodiment. In the second applied example, a pair of groups each comprising a plurality of compression members are disposed at respective positions opposing each other across the center axis of the tube 300. Since a plurality of compression members are included in each group, the outside diameter per compression member can be reduced, whereby the minimum thickness of the tube 300 and that of the plastic support 4 can be enhanced. As a consequence, problems such as projections of the compression members 2 from the plastic support 4 can be reduced. If the minimum thickness of each of the tube 300 and plastic support 4 is unchanged, then the outside diameter of the optical fiber unit 1 can be reduced. As a consequence, the outer sheath structure 8 disposed at the outer periphery of the optical fiber unit 1 can be made smaller. Further, the take-up drum 18 can also be made smaller, whereby a longer submarine optical cable 9 can be taken up.

Figure 16:
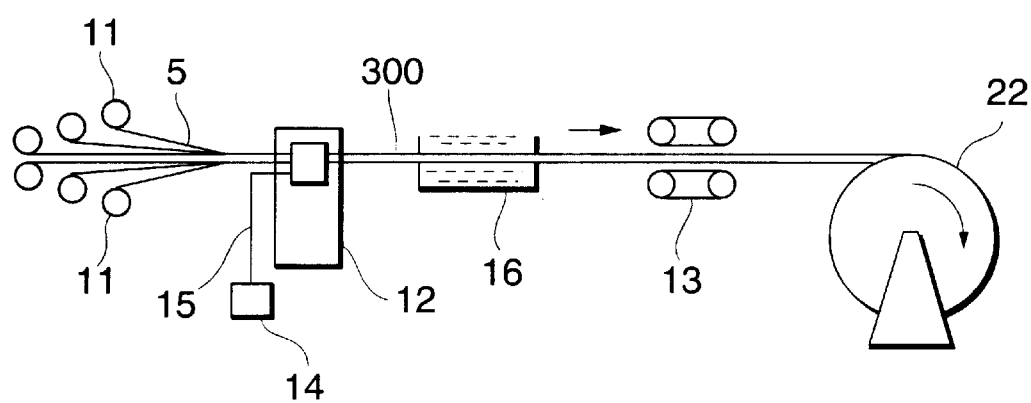
FIG. 16 is a view showing an apparatus for carrying out an earlier step (making a plastic tube in which coated optical fibers and a resin are introduced) in a method of making the optical fiber unit according to the second embodiment.
Figure 17:
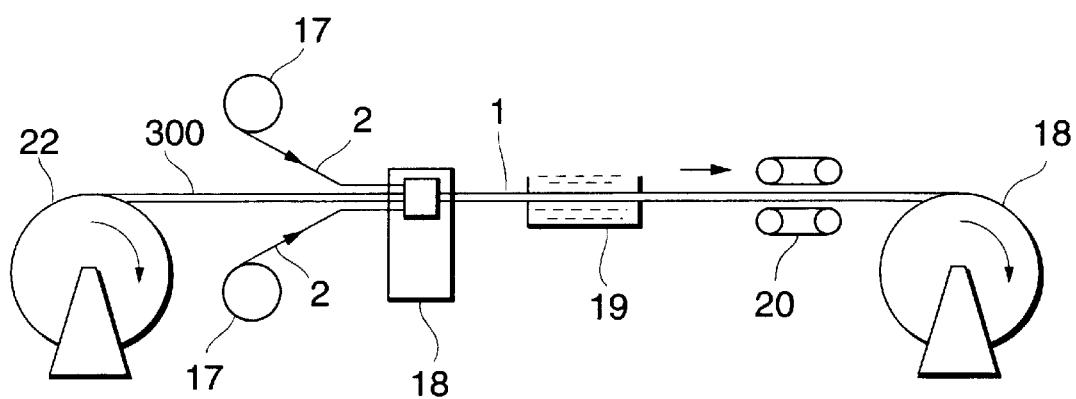
FIG. 17 is a view showing an apparatus for carrying out a later step (coating the plastic tube obtained in the earlier step with a plastic support) in the method of making the optical fiber unit according to the second embodiment.

For making the optical fiber unit 1 shown in FIG. 13, the apparatus shown in FIGS. 16 and 17 are used. The apparatus shown in FIG. 16 is one for making the plastic tube 300 (first step) and comprises bobbins 11 for supplying coated optical fibers 5, a first extruder 12 for extrusion-molding a tube 300 while introducing therein the coated optical fibers 5 supplied from the bobbins 11 and a waterproof resin 6 supplied from a resin feeder 14 by way of a pipe 15, and a water bath 16 for cooling and solidifying the extrusion-molded tube 300. Thus obtained plastic tube 300 is pulled by a pulling device 13 at a predetermined speed so as to be wound about a drum 22.

The apparatus shown in FIG. 17 is one for making the optical fiber unit 1 shown in FIG. 12A (second step) and comprises the drum 22 for supplying the tube 300 produced in the first step, reels 17 for supplying compression members 2 to be disposed at the outer periphery of the tube 300 in parallel with the coated optical fibers 5, a second extruder 18 for extrusion-molding a plastic support 4 having the compression members 2 embedded therein onto the outer periphery of the tube 300, and a water bath 19 for cooling and solidifying the extrusion-molded plastic support 4. Thus obtained optical fiber unit 1 is pulled by a pulling device 20 at a predetermined speed so as to be wound about a take-up drum 18.

In the above-mentioned method, the first step of extrusion-molding the plastic tube 300 and the second step of extrusion-molding the plastic support 4 are carried out separately from each other. As a consequence, even if a trouble occurs in the first step of introducing the coated optical fibers 5 and the waterproof resin 6 into the tube 300, the manufacture line can be stopped, adjusted, and then restarted. In particular, when a long cable such as a submarine optical cable is to be made, a delicate step of introducing the coated optical fibers 5 into the tube 300 is made thus stoppable so as not to produce a defective product.

Figure 18:
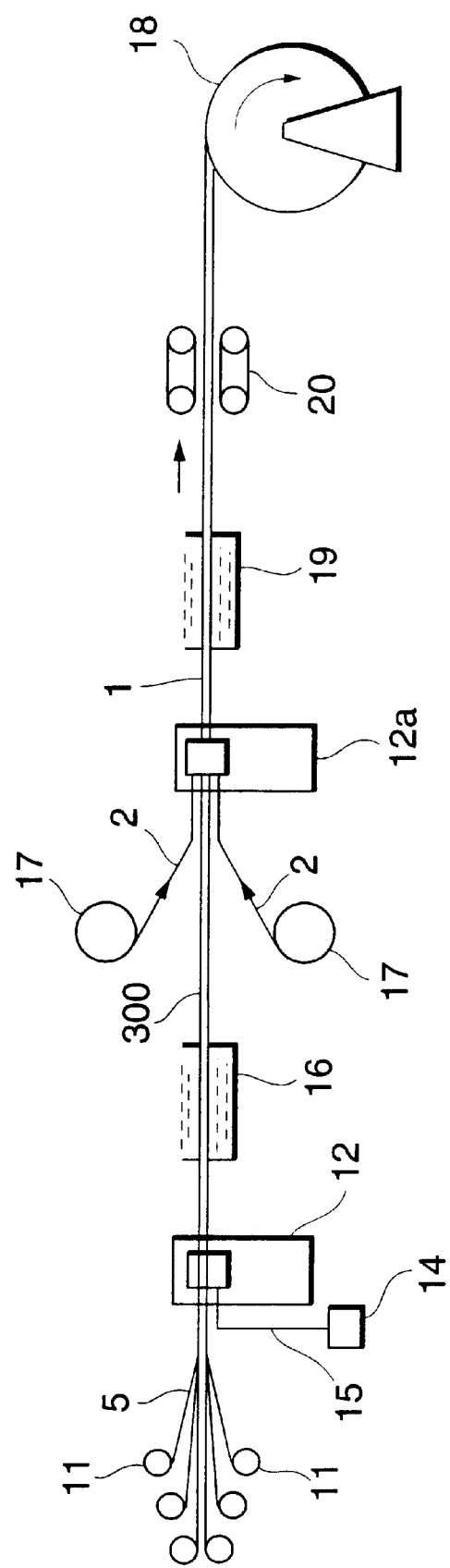
FIG. 18 is a view showing the configuration of an apparatus for simultaneously carrying out the earlier and later steps of the method of making the optical fiber unit according to the second embodiment.

For making the optical fiber unit 1 shown in FIG. 13 by another method, the apparatus shown in FIG. 18 is used. The apparatus shown in FIG. 18 comprises bobbins 11 for supplying coated optical fibers 5, a first extruder 12 for extrusion-molding a tube 300 while introducing therein a waterproof resin 6 supplied from a resin feeder 14 by way of a pipe 15, and a water bath 16 for cooling and solidifying the extrusion-molded tube 300 (first step of making the tube 300). The apparatus further comprises reels 17 for supplying compression members 2, a second extruder 12a for extrusion-molding a plastic support 4 having the compression members 2 embedded therein onto the outer periphery of the tube 300, and a water bath 19 for cooling and solidifying the extrusion-molded plastic support 4 (second step of making the optical fiber unit 1). Thus obtained optical fiber unit 1 is pulled by a pulling device 20 at a predetermined speed so as to be wound about a take-up drum 18.

According to the above-mentioned method, the first step of extrusion-molding the tube 300 while introducing the coated optical fibers 5 and the waterproof resin 6 therein and the second step of extrusion-molding the plastic support 4 having the compression members 2 embedded therein onto the outer periphery of the tube 300 made in the first step are continuously carried out. In the case where the tube 300 is taken up and temporarily stored, and then the plastic support 4 is applied thereto while the compression members 2 are introduced therein, the tube 300 may longitudinally shrink during the storage, whereby the amount of slack of coated optical fibers 5 in the tube 300 may change. Since the amount of shrinkage of the tube 300 may vary depending on conditions such as the storage time, temperature, humidity, and the like, it is not easy to control the amount of slack of the coated optical fibers 5 in general. When the above-mentioned both steps are carried out continuously, the extrusion-molded tube 300 is integrated with the compression members 2 by the plastic support 4 without substantially shrinking, so that the shrinkage of the tube 300 is suppressed, whereby the long optical fiber unit 1 exceeding 50 km can also be made in a state where the amount of slack is uniform. Since the submarine optical cable 9 is long, it is desirable to use a method of making an optical fiber unit 1 which yields a stable characteristic over such a long length.

When a steel wire is employed as the compression members 2, it is desirable that the compression members 2 be provided with an adhesive layer before extrusion-molding the plastic support 4. When polyethylene is employed as the plastic support 4, NUC-ACE manufactured by Nippon Unicar Co., Ltd., Admer manufactured by Mitsui Chemicals, Inc., or the like is preferably used. When polyvinyl chloride is employed as the plastic support 4, a material of urethane type, ethylene type, of the like, such as Pandex T-5102S manufactured by Dainippon Ink & Chemicals, Inc., Pylon manufactured by Toyobo Co., Ltd., or Aron Melt manufactured by Toagosei Co., Ltd., for example, is preferably used. When such an adhesive layer is provided, the drawing force of the compression members 2 and plastic support 4 increases by ten times or more.

Also, when a thermoplastic resin with the resin of the above-mentioned adhesive layer added thereto is used as the coating material for the compression member 2, it is effective not only in improving the bonding force between the compression member 2, which is a steel wire, and the plastic support 4, but also in enhancing the bonding force between the tube 300 and the plastic support 4.

In the optical fiber unit according to the second embodiment, as explained in the foregoing, since the coated optical fibers are movably accommodated within the tube, lateral pressures would not directly apply to the coated optical fibers, whereby loss can be kept from increasing due to microbend. Also, the integrated structure in which the compression member is embedded in the plastic support covering the tube suppresses the contraction of the tube caused by changes in temperature, thereby effectively restraining the locally concentrated increase in loss from occurring upon repeated changes of temperature.

Unlike the first conventional example, since the optical fiber unit according to the second embodiment does not have a structure in which coated optical fibers are wound about the outer periphery of a tension member, the loss is restrained from increasing due to a radiation mode, whereby a wider band would be obtained. Also, unlike the second conventional example, no metal tube is used, whereby it can be made safely at a higher speed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber unit employed in a submarine optical cable, said optical fiber unit comprising:

a plastic support extending along a predetermined axis, said plastic support including a space extending along said axis;

one or more coated optical fibers accommodated within said space;

a resin filling a gap between an inner wall face of said plastic support defining said space and said coated optical fibers, said resin having such a viscosity that said coated optical fibers are radially movable therein; and one or more rigid compression members embedded along said space in a plastic region between said inner wall face of said plastic support and an outer wall face of said plastic support defining an outer shape of said plastic support, wherein an outline of said space, defined by a cross-section of said plastic support, has a non-circular shape and is different from that of said plastic support; and wherein, in said cross-section of said plastic support, a minimum width of said space is greater than a maximum width of each of said rigid compression members.

2. An optical fiber unit according to claim 1, wherein said resin filling said space has such a viscosity that a penetration number within the range of 80 to 1000 is yielded.

3. An optical fiber unit according to claim 1, wherein said compression members include at least a pair of compression members provided so as to sandwich said space.

4. A submarine optical cable comprising: the optical fiber unit according to claim 1;

a plurality of tension members provided around said optical fiber unit; and a waterproof structure provided so as to cover said optical fiber unit and said plurality of tension members.

5. A method of making the optical fiber unit according to claim 1, said method comprising:

a first step of extrusion-molding and taking up a single plastic support provided with a space extending along a predetermined axis, said single plastic support having one or more rigid compression members embedded therein along said space; and a second step, carried out simultaneously with said first step, of directly introducing one or more coated optical fibers and a resin into the space formed in said single plastic support such that said resin fills a gap between an inner wall face of said plastic support and said coated optical fibers, said resin having such a viscosity that said coated optical fibers are radially movable therein.

6. A method of making the optical fiber unit according to claim 1, said method comprising:

a first step of extrusion-molding and taking up a single plastic support provided with a space extending along a predetermined axis, said single plastic support having one or more rigid compression members embedded therein along said space; and a second step of, while cutting a side wall of said single plastic support forming the space of said single plastic support being supplied, directly introducing one or more coated optical fibers and a resin from a widened cutout portion of said single plastic support such that said resin fills a gap between an inner wall face of said plastic support and said coated optical fibers, said resin having such a viscosity that said coated optical fibers are radially movable therein.

7. An optical fiber unit according to claim 1, wherein, in the cross-section of said plastic support, the outline of said space comprises, at least, a first line having a first curvature, and a second line facing said compression members and having a second curvature different from the first curvature.

8. An optical fiber unit according to claim 7, wherein, in the cross-section of said plastic support, the second line of the outline of said space includes a straight line.

9. An optical fiber unit according to claim 7, wherein, in the cross-section of said plastic support, a distance between the first line of the outline of said space and the outer periphery of said plastic support is maintained constant.

10. An optical fiber unit employed in a submarine optical cable, said optical fiber unit comprising:

a plastic support extending along a predetermined axis, said plastic support including a space extending along said axis;

one or more coated optical fibers accommodated within said space;

a resin filling a gap between an inner wall face of said plastic support defining said space and said coated optical fibers, said resin having such a viscosity that said coated optical fibers are radially movable therein; and one or more rigid compression members embedded along said space in a plastic region between said inner wall face of said plastic support and an outer wall face of said plastic support defining an outer shape of said plastic support, wherein an outline of said space, defined by a cross-section of said plastic support, has an off-centered shape such that the shape center of gravity of said shape deviates from the center of said cross-section of said plastic support, and wherein, in said cross-section of said plastic support, a minimum width of said space is greater than a maximum width of each of said rigid compression members.

11. An optical fiber unit according to claim 10, wherein said resin filling said space has such a viscosity that a penetration number within the range of 80 to 1000 is yielded.

12. An optical fiber unit according to claim 10, wherein said compression members include at least a pair of compression members provided so as to sandwich said space.

13. A submarine optical cable comprising:

the optical fiber unit according to claim 10;

a plurality of tension members provided around said optical fiber unit; and a waterproof structure provided so as to cover said optical fiber unit and said plurality of tension members.

14. A method of making the optical fiber unit according to claim 10, said method comprising:

a first step of extrusion-molding and taking up a plastic support provided with a space extending along a predetermined axis, said plastic support having one or more rigid compression members embedded therein along said space; and a second step, carried out simultaneously with said first step, of introducing one or more coated optical fibers and a resin into the space formed in said plastic support such that said resin fills a gap between an inner wall face of said plastic support and said coated optical fiber, said resin having such a viscosity that said coated optical fibers are radially movable therein.

15. A method of making the optical fiber unit according to claim 10, said method comprising:

a first step of extrusion-molding and taking up a plastic support provided with a space extending along a predetermined axis, said plastic support having one or more rigid compression members embedded therein along said space; and a second step of, while cutting a side wall of said plastic support forming the space of said plastic support being supplied, introducing one or more coated optical fibers and a resin from a widened cutout portion of said plastic support such that said resin fills a gap between in inner wall face of said plastic support and said coated optical fiber, said resin having such a viscosity that said coated optical fibers are radially movable therein.

* * * * *